United States Patent
Xu et al.

(10) Patent No.: US 10,969,282 B2
(45) Date of Patent: Apr. 6, 2021

(54) WIRELESS TEMPERATURE SENSORS AND METHODS

(71) Applicant: Florida State University Research Foundation, Inc., Tallahassee, FL (US)

(72) Inventors: Chengying (Cheryl) Xu, Tallahassee, FL (US); Justin Daniel, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 253 days.

(21) Appl. No.: 16/027,922

(22) Filed: Jul. 5, 2018

(65) Prior Publication Data

US 2020/0011744 A1 Jan. 9, 2020

(51) Int. Cl.
*G01K 7/32* (2006.01)
*G01K 1/024* (2021.01)
*H04Q 9/00* (2006.01)

(52) U.S. Cl.
CPC .............. *G01K 7/32* (2013.01); *G01K 1/024* (2013.01); *H04Q 9/00* (2013.01); *H04Q 2209/40* (2013.01)

(58) Field of Classification Search
CPC ............ G01K 7/32; G01K 1/024; H04Q 9/00; H04Q 2209/40
See application file for complete search history.

(56) References Cited

U.S. PATENT DOCUMENTS

| | | | |
|---|---|---|---|
| 6,278,379 B1 * | 8/2001 | Allen .................. | B60C 23/0408 340/870.16 |
| 7,477,050 B2 * | 1/2009 | Gambino .............. | G01D 5/243 324/253 |
| 9,485,037 B1 * | 11/2016 | Weller ................. | H01Q 1/36 |
| 2005/0033819 A1 * | 2/2005 | Gambino .............. | G01D 5/243 709/213 |
| 2006/0003152 A1 * | 1/2006 | Youngs ................ | H01B 1/22 428/212 |
| 2006/0202269 A1 * | 9/2006 | Suzuki ................. | H01O 9/27 257/347 |
| 2008/0174494 A1 * | 7/2008 | Suzuki ................. | H01Q 1/243 343/700 MS |
| 2008/0175300 A1 * | 7/2008 | Billington ............ | G01K 11/006 374/117 |
| 2010/0290503 A1 * | 11/2010 | Rumpf, Jr. ............ | G01K 7/32 374/163 |
| 2010/0321191 A1 * | 12/2010 | Gong ................... | G01N 22/02 340/584 |
| 2012/0007781 A1 | 1/2012 | Kim et al. | |

(Continued)

OTHER PUBLICATIONS

Li et al., "Electrical, Dielectric and Microwave-Absorption Properties of Polymer Derived SiC Ceramics in X Band," Journal of Alloys and Compounds, 2013, 565:66-72.

(Continued)

*Primary Examiner* — Nathaniel T Woodward
*Assistant Examiner* — Philip L Cotey
(74) *Attorney, Agent, or Firm* — Eversheds Sutherland (US) LLP

(57) ABSTRACT

Devices, including wireless temperature sensors, are provided. The devices may include a patch including a conductive material, a substrate, and a ground plane. The devices may be used in the systems and methods provided herein to measure a temperature. The substrates of the devices may include a dielectric material.

20 Claims, 8 Drawing Sheets

(56) References Cited

U.S. PATENT DOCUMENTS

| | | | |
|---|---|---|---|
| 2012/0273263 A1* | 11/2012 | Nagarajan | H05K 3/1216 |
| | | | 174/257 |
| 2012/0297888 A1* | 11/2012 | Nagarajan | G01M 5/0091 |
| | | | 73/774 |
| 2013/0125386 A1 | 5/2013 | Gregory et al. | |
| 2013/0193770 A1* | 8/2013 | Krishna | C08K 3/22 |
| | | | 307/104 |
| 2015/0028889 A1 | 1/2015 | Gong et al. | |

OTHER PUBLICATIONS

Li et al., "An Embedded Passive Resonant Sensor Using Frequency Diversity Technology for High-Temperature Wireless Measurement," IEEE Sensors Journal, 2015, 15(2):1055-1060.

Li et al., "Review of Research Status and Development Trends of Wireless Passive LC Resonant Sectors for Harsh Environments," Sensors, 2015, 15:13097-13109.

Liu et al., "High-Temperature Dielectric Properties of Aluminum Nitride Ceramic for Wireless Passive Sensing Applications," Sensors, 2015, 15:22660-22671.

Rad et al., "Embedded Microchip Patch Antenna for Structural Health Monitoring Applications," IEEE, 2008, 4 pages.

Ren et al., "Characterization of SiCN Ceramic Material Dielectric Properties at High Temperatures for Harsh Environment Sensing Applications," IEEE Transactions on Microwave Theory and Techniques, 2013, 61(2):960-971.

Riedel et al., "Synthesis of Dense Silicon-Based Ceramics at Low Temperatures," Nature, 1992, 355:714-717-.

Wang et al., "A Passive Wireless Temperature Sensor for Harsh Environment Applications," Sensors, 2008, 8:7982-7995.

Wang et al., "A Wireless Surface Acoustic Wave Temperature Sensor Using Langasite as Substrate Material for High-Temperature Applications," Jpn. J. Appl. Phys., 2003, 42:6124-6127.

Zhao et al., "Development of a Wireless Temperature Sensor Using Polymer-Derived Ceramics," Journal of Sensors, 2016, 5 pages.

Zhao et al., "Temperature Sensor Made of Polymer-Derived Ceramics for High-Temperature Applications," Sensors and Actuators A, 2014, 219:58-64.

Tan et al., "Antenna-Resonator Integrated Wireless Passive Temperature Sensor Based on Low-Temperature Co-Fired Ceramic for Harsh Environment", Sensors and Actuators A: Physical, vol. 236, pp. 299-308.

International Search Report and Written Opinion for International Application No. PCT/US2019/40494, dated Oct. 16, 2019.

\* cited by examiner

WIRELESS TEMPERATURE SENSORS AND METHODS

FIELD OF THE INVENTION

This invention relates to temperature sensors, including wireless temperature sensors, and methods and systems for measuring temperature.

BACKGROUND

A number of temperature sensors exist, including thermocouples, optical-based non-contact sensors, piezoelectric sensors, and silicon carbide (SiC)-based sensors. These temperature sensors, however, may not be capable of transmitting their temperature determinations wirelessly.

Another disadvantage associated with at least some temperature sensors relates to their use of functional electronics, such as batteries, chips, and/or wires. Functional electronics should not be used in certain environments, such as high temperature environments, due to the fact that functional electronics frequently malfunction when exposed to high temperatures.

Many temperature sensors also lack a low profile, which can cause difficulty when used in certain locations. Natural processes, such as the flow profile inside a turbine engine, can be disrupted by high profile temperature sensors.

Passive resonant circuit (LC circuit) telemetry sensors have been used in order to measure temperature. The techniques associated with these devices include passively coupling LC circuits magnetically and reading the resonance of the passive circuit. However, LC circuits have notoriously small read ranges, typically on the order of centimeters, due to the near field coupling required to transmit a signal. This can make LC sensors unfeasible for certain applications.

Surface acoustic wave (SAW) sensors also have been used. SAW sensors use modulation of surface acoustic waves in order to measure a physical property. However, the low frequency of operation can create severe problems when miniaturizing sensors for applications in which a low profile is desirable or necessary.

Dielectric resonators have been used in order to transmit various physical properties. Dielectric resonators can maintain high Q factors at elevated temperature, which allows for read ranges of 1 to 2 meters. However, the Q factor decays exponentially as the temperature increases, and the resonance is usually high, therefore requiring costly equipment for measurement.

There remains a need for temperature sensors, including wireless temperature sensors, that may be used in harsh conditions, including, but not limited to, high temperatures (e.g., 700° C. to 1,800° C.), elevated pressures (e.g., 200 psi to 50,000 psi), corrosive environments, and/or environments including radiation. There also remains a need for temperature sensors, including wireless temperature sensors, that have a low profile and may be used in certain locations.

BRIEF SUMMARY

Provided herein are devices that may serve as wireless temperature sensors that are capable, in some embodiments, of measuring temperatures of at least 1,000° C. Embodiments of the devices provided herein can be used to measure a temperature in real time. The measurements may be collected in harsh conditions, including, but not limited to, high temperatures (e.g., 700° C. to 1,800° C.), elevated pressures (e.g., 200 psi to 50,000 psi), corrosive environments, and/or environments including radiation.

In one aspect, devices, including wireless temperature sensors, are provided. In some embodiments, the devices include a patch including a conductive material; a substrate (i) including a polymer derived ceramic, and (ii) having a dielectric constant ($\varepsilon_r$) at 25° C. of about 2 to about 15; and a ground plane; wherein the substrate is arranged between the patch and the ground plane, and the substrate is in contact with both the patch and the ground plane.

In another aspect, systems for measuring are provided. In some embodiments, the systems include a receiving antenna including a device as described herein; an interrogation antenna; and a vector network analyzer. In some embodiments, a distance between the receiving antenna and the interrogation antenna is at least 0.5 m.

In yet another aspect, methods of measuring are provided. In some embodiments, the methods include providing a system as described herein, wherein the receiving antenna is disposed at a location; generating a frequency sweep with the vector network analyzer; broadcasting the frequency sweep to the receiving antenna with the interrogation antenna; determining the resonant frequency of the receiving antenna; and converting the resonant frequency to a temperature at the location.

DETAILED DESCRIPTION

In some embodiments, the devices herein include a substrate and a patch including a conductive material, and the patch is a resonating element in the methods provided herein. Since, in some embodiments, the patch is the resonating element, the Q factor may decay as a function of the conductivity of the patch and not the substrate, thereby permitting far field (e.g., ≥0.5 m) interrogation. In some embodiments, using time domain gating techniques, the responses of the devices provided herein can be isolated in a high reflection environment from a distance of at least 0.5 meters at temperatures up to 1,000° C. or greater.

In some embodiments, the devices provided herein include a patch including a conductive material; a substrate including a dielectric material; and a ground plane; wherein the substrate is arranged between the patch and the ground plane, and the substrate is in contact with both the patch and the ground plane.

Devices

In some embodiments, the devices provided herein include a patch including a conductive material; a substrate (i) including a polymer derived ceramic, and (ii) having a dielectric constant ($\varepsilon_r$) at 25° C. of about 2 to about 15; and a ground plane; wherein the substrate is arranged between the patch and the ground plane, and the substrate is in contact with both the patch and the ground plane.

Figure 1A:
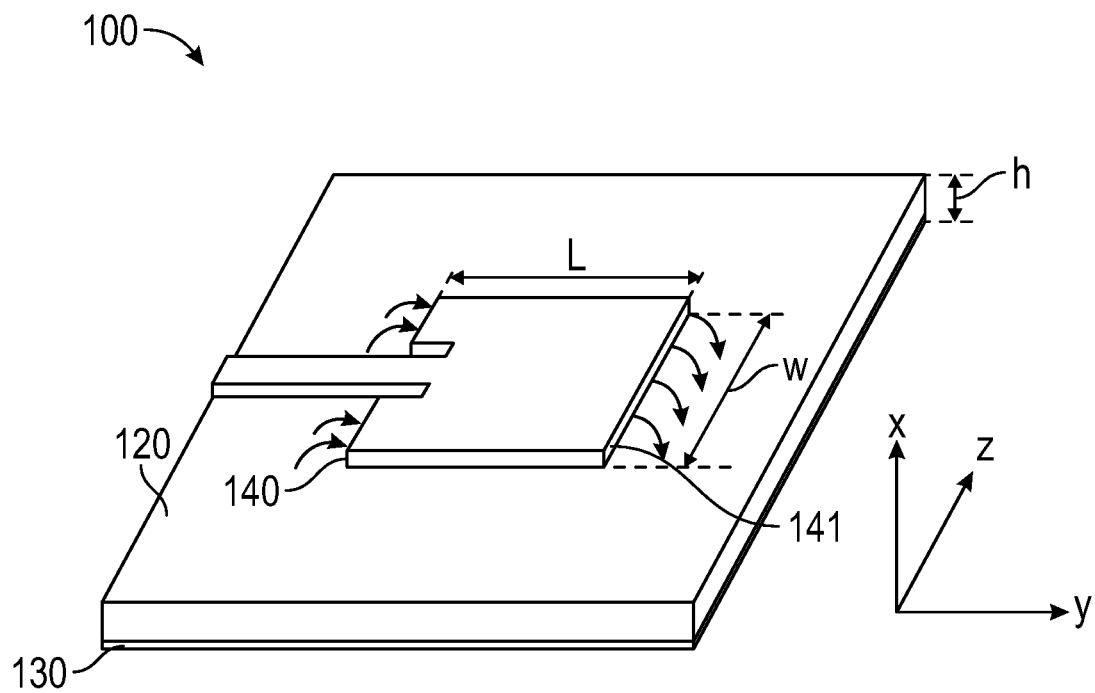
FIG. 1A depicts a perspective view of an embodiment of a device provided herein.
Figure 1B:
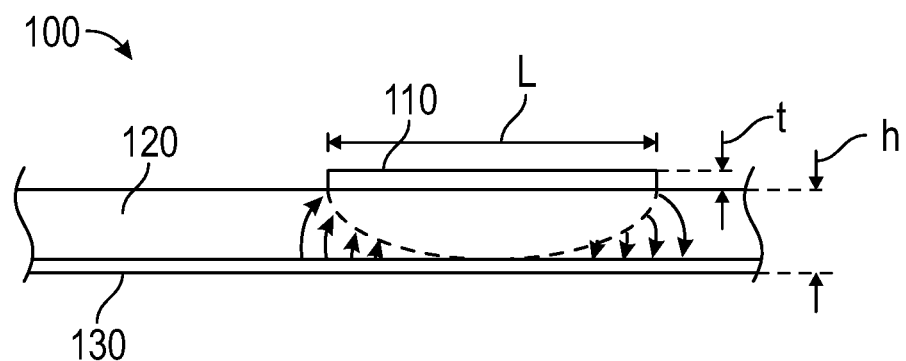
FIG. 1B depicts a side view of the device of FIG. 1A.

An embodiment of a device is depicted at FIG. 1A (perspective view) and FIG. 1B (side view). The device 100 of FIG. 1A includes a patch 110, a substrate 120, and a ground plane 130. The substrate 120 is arranged between the patch 110 and the ground plane 130, and the substrate is in contact with the patch 110 and the ground plane 130. The device 100 also includes a first radiating slot 140 and a second radiating slot 141.

Patches

The patches of the devices provided herein include a conductive material. The conductive material may include carbon, platinum, silver, or a combination thereof. The conductive material may be a conductive paste. In some embodiments, the conductive material includes a carbon paste, a silver paste, a platinum paste, or a combination thereof.

The patches generally may be formed by any known techniques. In some embodiments, a paste of a conductive material is placed into a mold, and dried to remove moisture from the paste. In some embodiments, the paste of a conductive material is included in an aqueous liquid, which may include a silicate. The removal of moisture from a paste may be achieved by any known technique.

The patches of the devices provided herein may have any suitable dimensions. In some embodiments, the patches have dimensions that are smaller than the dimensions of a substrate. For example, a surface of a substrate may extend beyond all sides of a patch when a patch is arranged on and in contact with a substrate.

In some embodiments, a patch of a device provided herein has a thickness of about 0.05 mm to about 3 mm. In some embodiments, a patch of a device provided herein has a thickness of about 0.05 mm to about 2.8 mm. In some embodiments, a patch of a device provided herein has a thickness of about 0.05 mm to about 2.8 mm. In some embodiments, a patch of a device provided herein has a thickness of about 0.05 mm to about 2.4 mm. In some embodiments, a patch of a device provided herein has a thickness of about 1.5 mm to about 3 mm. In some embodiments, a patch of a device provided herein has a thickness of about 1.5 mm to about 2.8 mm. In some embodiments, a patch of a device provided herein has a thickness of about 1.6 mm to about 2.8 mm. In some embodiments, a patch of a device provided herein has a thickness of about 1.8 mm to about 2.4 mm. In some embodiments, a patch of a device provided herein has a thickness of about 2.4 mm. The thickness (t) of an embodiment of a patch is depicted at FIG. 1B.

In some embodiments, a patch of a device provided herein has a length of about 2 mm to about 20 mm. In some embodiments, a patch of a device provided herein has a length of about 2 mm to about 16 mm. In some embodiments, a patch of a device provided herein has a length of about 10 mm to about 20 mm. In some embodiments, a patch of a device provided herein has a length of about 12 mm to about 16 mm. In some embodiments, a patch of a device provided herein has a length of about 14. The length (l) of an embodiment of a patch is depicted at FIG. 1A and FIG. 1B.

In some embodiments, a patch of a device provided herein has a width of about 2 mm to about 12 mm. In some embodiments, a patch of a device provided herein has a width of about 2 mm to about 11 mm. In some embodiments, a patch of a device provided herein has a width of about 8 mm to about 12 mm. In some embodiments, a patch of a device provided herein has a width of about 9 mm to about 11 mm. In some embodiments, a patch of a device provided herein has a width of about 10.5 mm.

In some embodiments, a patch of a device provided herein has a thickness about 1.8 mm to about 2.4 mm, a length of about 12 mm to about 16 mm, and a width of about 9 mm to about 11 mm.

The patches of the devices provided herein generally may have a surface area of any shape. In some embodiments, the patches are polygonal, i.e., substantially square, substantially rectangular, etc.

The patches of the device provided herein may be affixed to a substrate by any known technique and/or with any material.

Substrates

The substrates of the devices provided herein may include a dielectric material. In some embodiments, the dielectric material is a polymer derived ceramic.

In some embodiments, the dielectric constant ($\varepsilon_r$) at 25° C. of the dielectric material is about 2 to about 20. In some embodiments, the dielectric constant ($\varepsilon_r$) at 25° C. of the dielectric material is about 2 to about 15. In some embodiments, the dielectric constant ($\varepsilon_r$) at 25° C. of the dielectric material is about 2 to about 12. In some embodiments, the dielectric constant ($\varepsilon_r$) at 25° C. of the dielectric material is about 2 to about 10. In some embodiments, the dielectric constant ($\varepsilon_r$) at 25° C. of the dielectric material is about 2 to about 8. In some embodiments, the dielectric constant ($\varepsilon_r$) at 25° C. of the dielectric material is about 2 to about 6. In some embodiments, the dielectric constant ($\varepsilon_r$) at 25° C. of the dielectric material is about 4 to about 6. In some embodiments, the dielectric constant ($\varepsilon_r$) at 25° C. of the dielectric material is about 5. In some embodiments, the dielectric constant ($\varepsilon_r$) at 25° C. of the dielectric material is about 2 or greater.

In some embodiments, the substrate includes a polymer derived ceramic, and the polymer derived ceramic includes SiC, SiCN, SiBCN, SiAlCN, SiOC, or a combination thereof.

Not wishing to be bound by any particular theory, it is believed that the material properties (e.g., electrical properties) of the polymer derived ceramic can be controlled, in some embodiments, by doping, using co-polymers/polymer blends, or a combination thereof. In some embodiments, material properties of a polymer derived ceramic can be changed by varying processing conditions.

In some embodiments, the gauge factor of a polymer derive ceramic is about 1,000 to about 4,000.

The polymer derived ceramics may be made using any known techniques. In some embodiments, the polymer derived ceramics are synthesized by the thermal decomposition of polymeric precursors. Such methods can avoid the use of conventional powder-metallurgy-based ceramic processing techniques.

In some embodiments, the polymeric precursor includes a low viscosity liquid thermosetting resin. In some embodiments, the polymeric precursor includes polysilazane.

Not wishing to be bound by any particular theory, embodiments of the polymer derived ceramics herein may exhibit high temperature survivability, desirable oxidation/corrosion resistance properties, flexible material and/or structural design, flexible manufacturing, multi-functional capability, or a combination thereof. Regarding flexible manufacturing, the production of a polymer derived ceramic can be achieved in a liquid precursor phase (e.g., by using 3D printing technique), a polymer phase (e.g., by using a well-developed manufacturing process, such as milling, turning, etc.), or a ceramic phase (e.g., grinding). Regarding multi-functional capability, the polymer derived ceramics may provide specific tunable electrical and/or dielectric properties, which can, in some embodiments, provide a direct sensing mechanism.

In some embodiments, the permittivity of a polymer derived ceramic material increases monotonically as its temperature is increased—up to 1,000 K (727° C.).

The following table includes a list of polymer derived ceramic materials that may be included in the substrates of the devices provided herein, along with selected properties of the polymer derived ceramics.

| Materials | Annealing Temp. (° C.) | Frequency (GHz) | Test Temp. (° C.) | Reference |
|---|---|---|---|---|
| SiC | 1100-1600 | 8.2-12.4 | RT | [1] |
| SiBCN | 900-1800 | 8.2-18 | RT | [2] |
| SiCN | 1350-1700 | 8.2-12.4 | RT | [3] |
| SiC nanoparticle/SiBCN composite | 900 | 8.2-12.4 | RT | [4] |
| 15 wt % SiC/SiBCN composite | 900 | 8.2-12.4 | RT-500 | [4] |
| Ferrocene-modified SiC/C composite | 1150-1350 | 8.2-12.4 | RT | [5] |
| Ferrocene-containing SiOC composite | 900-1450 | 8.2-12.4 | RT | [6] |
| SiC nanowires reinforced SiOC composite | 1300-1450 | 8.2-12.4 | RT | [7] |

[1] Zhao, R. et al., Sensors and Actuators A: Physical, 219: 58-64, 2014.
[2] Zhao, R. et al., Journal of Sensors, 2016, 2016.
[3] Wang, S. et al., Japanese Journal of Applied Physics, 42(9S): 6124, 2003.
[4] Wang, Y. et al. Sensors, 8(12): 7982-7995, 2008.
[5] Li, C. et al., Sensors, 15(6): 13097-13109, 2015.
[6] Li, Ch. et al., IEEE Sensors Journal, 15(2): 1055-1060, 2015.
[7] Liu, J. et al., Sensors, 15(9): 22660-22671, 2015.

The substrates of the devices provided herein may have any suitable shape. The surface areas of the substrates may be polygonal (i.e., substantially rectangular, substantially square, etc.), or non-polygonal (i.e., substantially circular, substantially elliptical, substantially oval, etc.).

In some embodiments, the substrates have a surface area that is substantially circular, and a diameter of about 15 mm to about 25 mm, or about 18.5 mm.

The substrates generally may have any height ((h), see FIG. 1A and FIG. 1B), and the height may be selected to achieve one or more properties. The height of the substrate, for example, may be selected to ensure that the patch and the ground plane are separated by a desired distance, thereby achieving one or more desirable properties of the devices provided herein.

Ground Planes

The ground planes of the devices provided herein may include any one or more of the conductive materials included in a patch. The conductive material may include carbon, platinum, silver, or a combination thereof. In some embodiments, the conductive material includes a carbon paste, a silver paste, a platinum paste, or a combination thereof.

The ground planes of the devices provided herein may be affixed to a substrate by any known techniques. In some embodiments, the ground plane has dimensions that substantially correspond to the dimensions of the substrate.

Systems

Also provided herein are systems for measuring. The systems may collect any measurement that may be derived from the information detected or provided by a device provided herein. In some embodiments, the systems measure a temperature.

In some embodiments, the systems provided herein include a receiving antenna; an interrogation antenna; and a vector network analyzer. The receiving antenna may be selected from a device provided herein, including a device that includes a patch, a substrate, and a ground plane. For example, the receiving antenna may be a reflective micropatch antenna. The antenna may include a radiating patch on one side of a dielectric substrate and a ground plane on the other side. Not wishing to be bound by any particular theory, it is believed that a resonant frequency can be designed based on patch geometry. The receiving antenna may be passive (i.e., no power needed).

The receiving antenna of the systems provided herein may be a wireless sensor. The distance between a receiving antenna and an interrogation antenna may be at least 0.5 m. In some embodiments, the distance between a receiving antenna and an interrogation antenna is about 0.5 m to about 10 m. In some embodiments, the distance between a receiving antenna and an interrogation antenna is about 0.5 m to about 8 m. In some embodiments, the distance between a receiving antenna and an interrogation antenna is about 0.5 m to about 6 m. In some embodiments, the distance between a receiving antenna and an interrogation antenna is about 0.5 m to about 4 m. In some embodiments, the distance between a receiving antenna and an interrogation antenna is about 0.5 m to about 2 m.

The receiving antenna generally may be placed at a location at which a measurement is to occur. In some embodiments, the receiving antenna of the system is arranged in or on (i) a turbine engine, (ii) a hypersonic vehicle, (iii) a nuclear reactor, or (iv) a fuel cell. The receiving antenna also may be used in material processing.

The interrogation antenna of the systems provided herein may be a transmitter antenna, such as a horn antenna. The horn antenna may include a metal flaring waveguide, which may be configured to direct electromagnetic waves in a beam.

Methods

Also provided herein are methods of measuring. The methods of measuring may measure a temperature that may be derived from the information detected or provided by a receiving antenna.

In some embodiments, the methods provided herein include providing a system that includes (i) a receiving antenna, (ii) an interrogation antenna, and (iii) a vector network analyzer, wherein the receiving antenna is disposed at a location; generating a frequency sweep with the vector network analyzer; broadcasting the frequency sweep to the receiving antenna with the interrogation antenna; determining the resonant frequency of the receiving antenna; and converting the resonant frequency to a temperature at the location.

In some embodiments, the temperature at the location is about 700° C. to about 1,800° C. In some embodiments, the temperature at the location is about 700° C. to about 1,600° C. In some embodiments, the temperature at the location is about 700° C. to about 1,400° C. In some embodiments, the temperature at the location is about 700° C. to about 1,200° C. In some embodiments, the temperature at the location is about 700° C. to about 1,000° C.

In some embodiments, the pressure at the location is about 1 atm. In some embodiments, the pressure at the location is about 200 psi to about 50,000 psi. In some embodiments, the pressure at the location is about 300 psi to about 50,000 psi. In some embodiments, the pressure at the location is about 400 psi to about 50,000 psi. In some embodiments, the pressure at the location is about 500 psi to about 50,000 psi. In some embodiments, the pressure at the location is about 200 psi to about 600 psi. In some embodiments, the pressure at the location is about 300 psi to about 600 psi. In some embodiments, the pressure at the location is about 400 psi to about 600 psi. In some embodiments, the pressure at the location is about 500 psi to about 600 psi.

The frequency sweep of the methods provided herein may include any frequencies within a range of frequencies that permits the methods to measure a temperature. In some embodiments, the frequency sweep includes a plurality of frequencies from about 1 GHz to about 50 GHz. In some embodiments, the frequency sweep includes a plurality of frequencies from about 1 GHz to about 6 GHz.

Embodiments of the wireless temperature sensors provided herein may be used in a number of applications in a number of industries, including, but not limited to, the defense industry and the commercial space industry. The defense industry, for example, may use embodiments of the wireless temperature sensors provided herein in warheads, aircraft, and other military equipment and vehicles. The commercial space industry, for example, may use embodiments of the wireless temperature sensors provided herein in turbine engines and other equipment.

The terms "a," "an," and "the" are intended to include plural alternatives, e.g., at least one. For instance, the disclosure of "a substrate," "a conductive material," and the like, is meant to encompass one, or mixtures or combinations of more than one substrate, conductive material, and the like, unless otherwise specified.

In the descriptions provided herein, the terms "includes," "is," "containing," "having," and "comprises" are used in an open-ended fashion, and thus should be interpreted to mean "including, but not limited to." When methods or systems are claimed or described in terms of "comprising" various components or steps, the methods or systems can also "consist essentially of" or "consist of" the various components or steps, unless stated otherwise.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in one embodiment, that a patch of a device provided herein has a thickness of about 1.8 mm to about 2.4 mm. This range should be interpreted as encompassing thicknesses of about 1.8 mm and about 2.4 mm, and further encompasses "about" each of 1.9 mm, 2.0 mm, 2.1 mm, 2.2 mm, and 2.3 mm, including any ranges and sub-ranges between any of these values.

The term "about", as used herein, refers to values that are within 5% of the indicated value. For example, "about 200 psi" would encompass pressures of 190 psi to 210 psi. The term "substantially", as used herein, refers to values that are within 10% of the indicate feature. For example, an object is "substantially circular" when a first diameter of the object is within 10% of a second diameter that is measured at any angle relative to the first diameter. Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Theory and Simulation

This example addresses a mathematical model for designing a patch antenna for use as a temperature sensor. In a following example, a High Frequency Structural Simulator (HFSS) is used to validate a design of the patch antenna.

In this example, a microstrip patch antenna was chosen as the radiating element, due, at least in part, to its small profile, ease of manufacture, and rapid prototyping.

The microstrip patch antennas of this example included a ground plane, a dielectric substrate, and a conductive patch. The patch antennas of this example were designed to increase, and possibly maximize, the electrical pattern normal to the surface of the patch. The geometrical properties of the patch antenna were approximated using the transmission line model, and modeled in a full wave electromagnetic simulator.

The transmission line model treated the antenna as an array of two radiating slows, separated by a low impedance Z transmission line of length, L. Due to fringing effects caused by the finite dimensions of the antenna of this example, waves traveled through air and the dielectric during resonance.

At low frequencies, the dielectric constant was constant, however, during high frequency waves, more of the waves were concentrated in the substrate, which resulted in a dielectric constant closer to the substrate. Therefore, an effective dielectric constant could be calculated by equation (1):

$$\varepsilon_{reff} = \frac{\varepsilon_r + 1}{2} + \frac{\varepsilon_r - 1}{2}\left[1 + 12\frac{h}{w}\right]^{-\frac{1}{2}}, \quad (1)$$

where $\varepsilon_r$ is the dielectric constant of the substrate, h is the height of the substrate, and W is the width of the patch.

For an efficient radiator a practical width that lead to good radiation efficiencies was calculated by equation (2):

$$W = \frac{C}{2*f_r}\sqrt{\frac{2}{\varepsilon_r+1}},\qquad(2)$$

where C is the speed of light, and $f_r$ was the target resonant frequency at room temperature.

In order to calculate the length of the patch, the fringing effect was taken into account. Electrically the patch appeared larger in the E-plane (xy-plane), which caused the length to be extended on each side of the patch by a distance $\Delta L$:

$$\Delta L = 0.412h\frac{(\varepsilon_{reff}+0.3)\left(\frac{W}{h}+0.264\right)}{(\varepsilon_{reff}-0.258)\left(\frac{W}{h}+0.8\right)}.\qquad(3)$$

The effective length of the patch was calculated by subtracting the fringing effects extension by equation (4):

$$L_{eff}=L+2\Delta L\qquad(4).$$

where L is the actual length of the electrical patch.

Therefore, an electrical patch was made to be resonant at a specific frequency by k knowing the operational parameters, which included: permittivity of the substrate ($\varepsilon_r$), height of the substrate (h), and the operating frequency ($f_r$).

Example 2—Design of Sensor

This example details the operating parameters, design, and simulation of an embodiment of a patch antenna using HFSS.

Substrate Selection:

Kion Ceraset polysilazane was selected as the substrate for the sensor design of this example.

Polysilazane is a liquid thermosetting resin containing repeat units of nitrogen and silicon bonded in an alternating sequence. Polysilazane is versatile with a low viscosity of 80 cps at room temperature, and can yield ceramics through pyrolysis.

Figure 2:
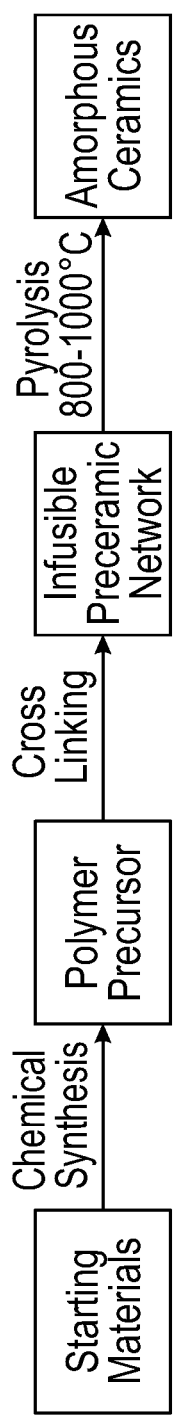
FIG. 2 depicts an embodiment of a process for preparing a polymer derived ceramic.

Polymer derived ceramics (PDC) have tailorable electrical properties, including high temperature survivability, oxidation resistance, and/or flexible manufacturing capabilities. The processing steps that were used for synthesizing the PDCs of this example are provided at FIG. 2. The liquid resin was cured into a polymer or ceramic.

As the temperature was increased, the PDC had a monotonically increasing dielectric constant. This relationship allowed a measurable change in temperature when the dielectric constant was determined wirelessly. The following equation was arranged in order to determine the dielectric constant of the substrate:

$$f_r = \frac{C}{2*W}*\sqrt{\frac{2}{\varepsilon_r+1}}.\qquad(5)$$

The resonant frequency and dielectric constant of the substrate had an inverse relationship.

Simulation:

The operating parameters and patch dimensions of the embodiment of this example are depicted at the following table:

| Antenna Parameter | Dimension |
|---|---|
| Width | 14 mm |
| Length | 10.5 mm |
| Thickness | 2.4 mm |
| $f_0$ | 5.8 GHz |

Figure 3:
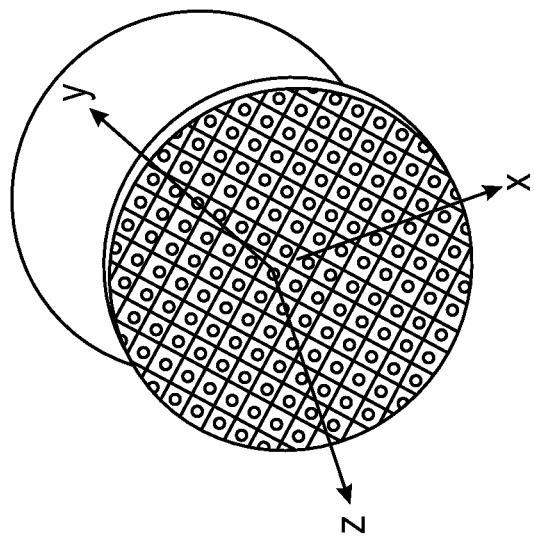
FIG. 3 depicts a three-dimensional model of an embodiment of a sensor created in a High Frequency Structural Simulator (HFSS).
Figure 3:
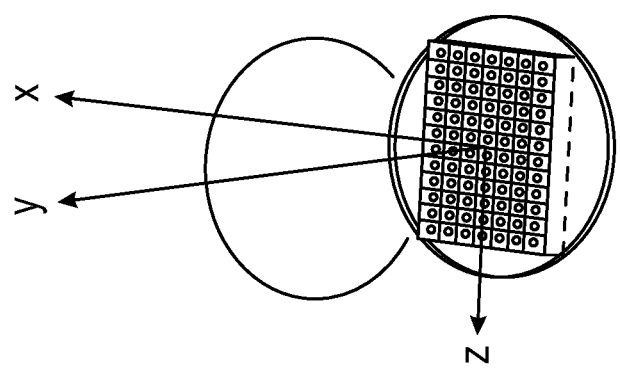

After calculating the geometric properties for the antenna, the width was chosen in this example to be 14 mm, and the length was chosen as 10.5 mm. In order to confirm the antenna design a three-dimensional (3D) model of the sensor was created in HFSS, as depicted at FIG. 3.

Figure 4:
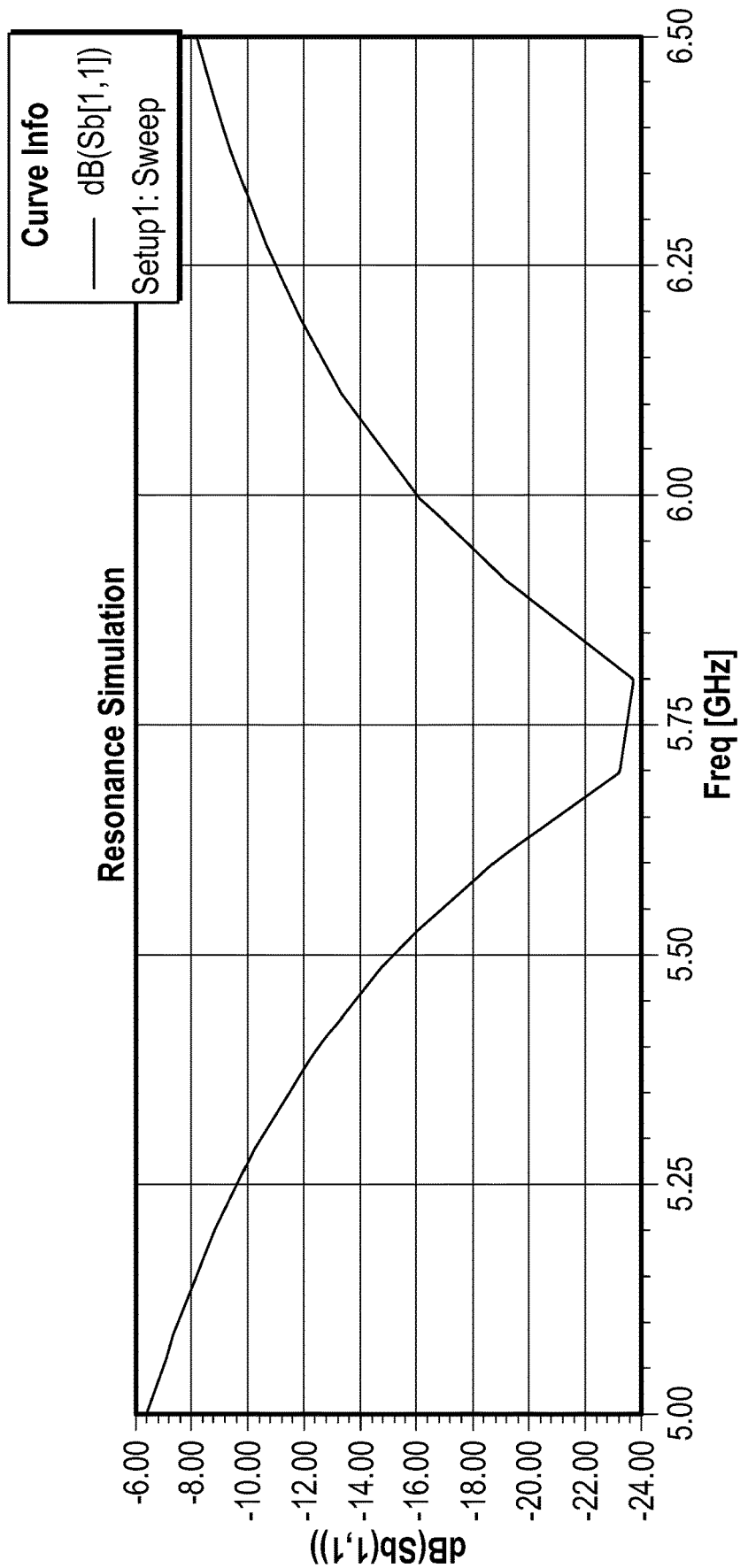
FIG. 4 depicts an HFSS simulation of an embodiment of a patch antenna.

The dielectric constant of the substrate was chosen to be 3.6, and the S11 graph was plotted, as depicted at FIG. 4.

The lowest amplitude from the S11 graph of FIG. 4 showed the resonance of the sensor to be 5.75 GHz, which was very close to the theoretical resonance of the patch.

Figure 5:
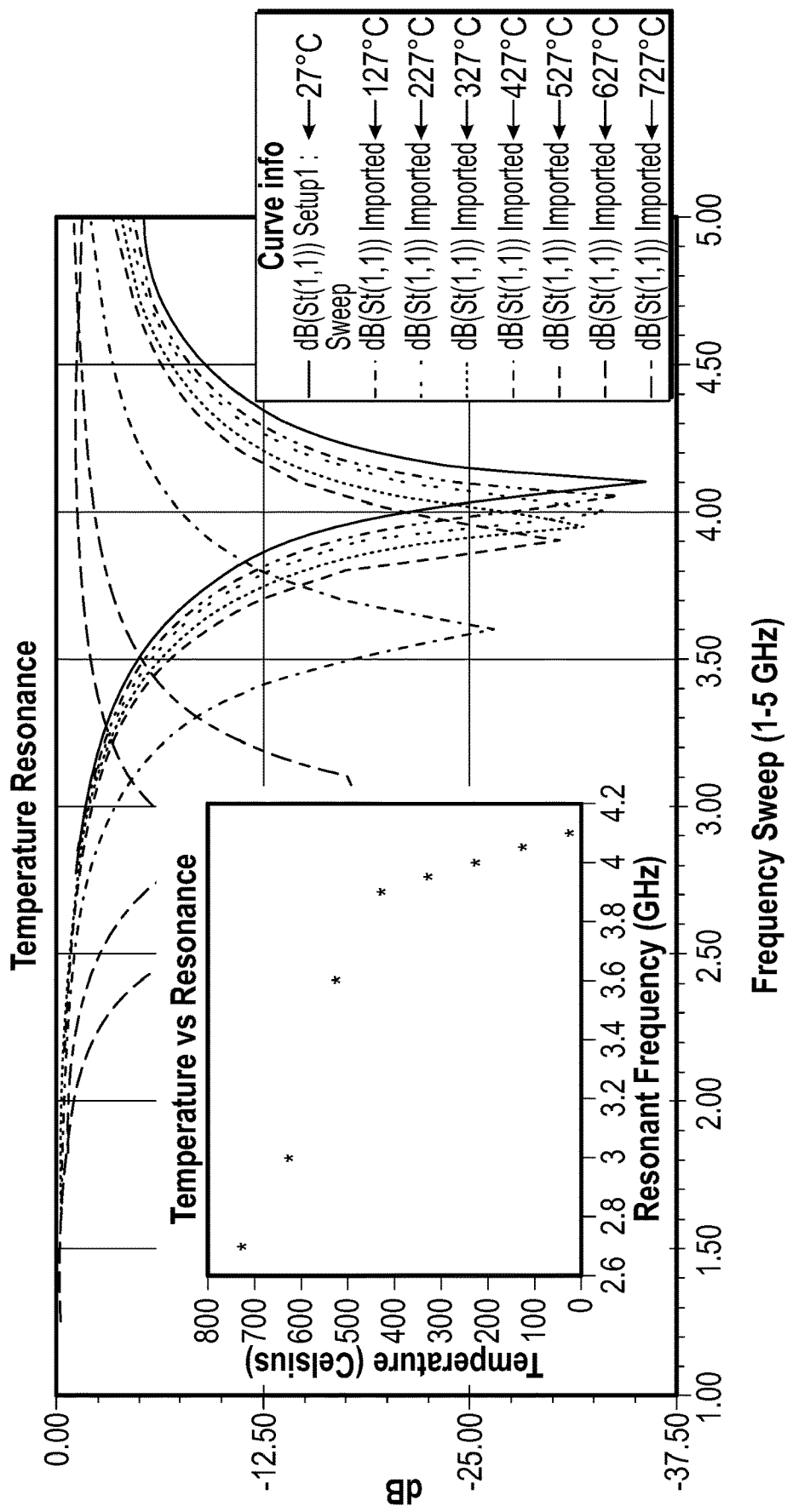
FIG. 5 depicts simulation results obtained for an embodiment of a patch antenna, including a plot of temperature v. resonance (inset).

Another simulation was run in order to show the resonance shift versus temperature for the sensor. Using previously known data, the dielectric constant was changed every 100° C., and simulated to show a monotonic decreasing relationship with increasing temperature. This simulation showed that the resolution of the sensor should increase as the temperature increases due to an exponentially increasing dielectric constant. The simulation results are depicted at FIG. 5.

Fabrication:

In order to fabricate the sensor, the PDC was formed into a puck having a diameter of 18.24 mm.

The liquid resin was first put into a mold and heated in order to perform cross-linking of the polymer, which resulted in a semi-transparent polymer. The polymer was then ground up using a ball mill and packed into a mold and pressed into a puck.

The puck was then subjected to pyrolysis, which resulted in an amorphous ceramic.

In order to fabricate the antenna, an inverse mold of the patch was created out of 6061 aluminum and water jetted to size. The tolerance for the waterjet was 0.001 inches.

After the mold was created, carbon paste in a silicate aqueous solution was used to form the conductive patch and ground plane. The carbon paste was brushed into the inverse mold, and a clamp was used to apply pressure.

The trace was then air dried for four hours, and then placed into a furnace in order to evaporate the water in the matrix. The same procedure was used in order to fabricate the ground plane.

Example 3—Wireless Temperature Measurement

This example details the experimental setup for a wireless temperature measurement.

In order to record a sensor's resonance, an interrogation antenna, a receiving antenna, and a vector network analyzer were used.

The interrogation antenna operated from a range of 0.6-8 GHz, with a gain of 6-15 dB. The vector network analyzer was a PXI-M9375a from Keysight Technologies that produced a frequency sweep, and was broadcasted by the interrogation antenna.

The network analyzer was capable of producing signals between 300 KHz-26.5 GHz. The signal traveled through free space until it reached the sensor. For frequencies other than $f_r$, the signal was rejected.

Figure 6:
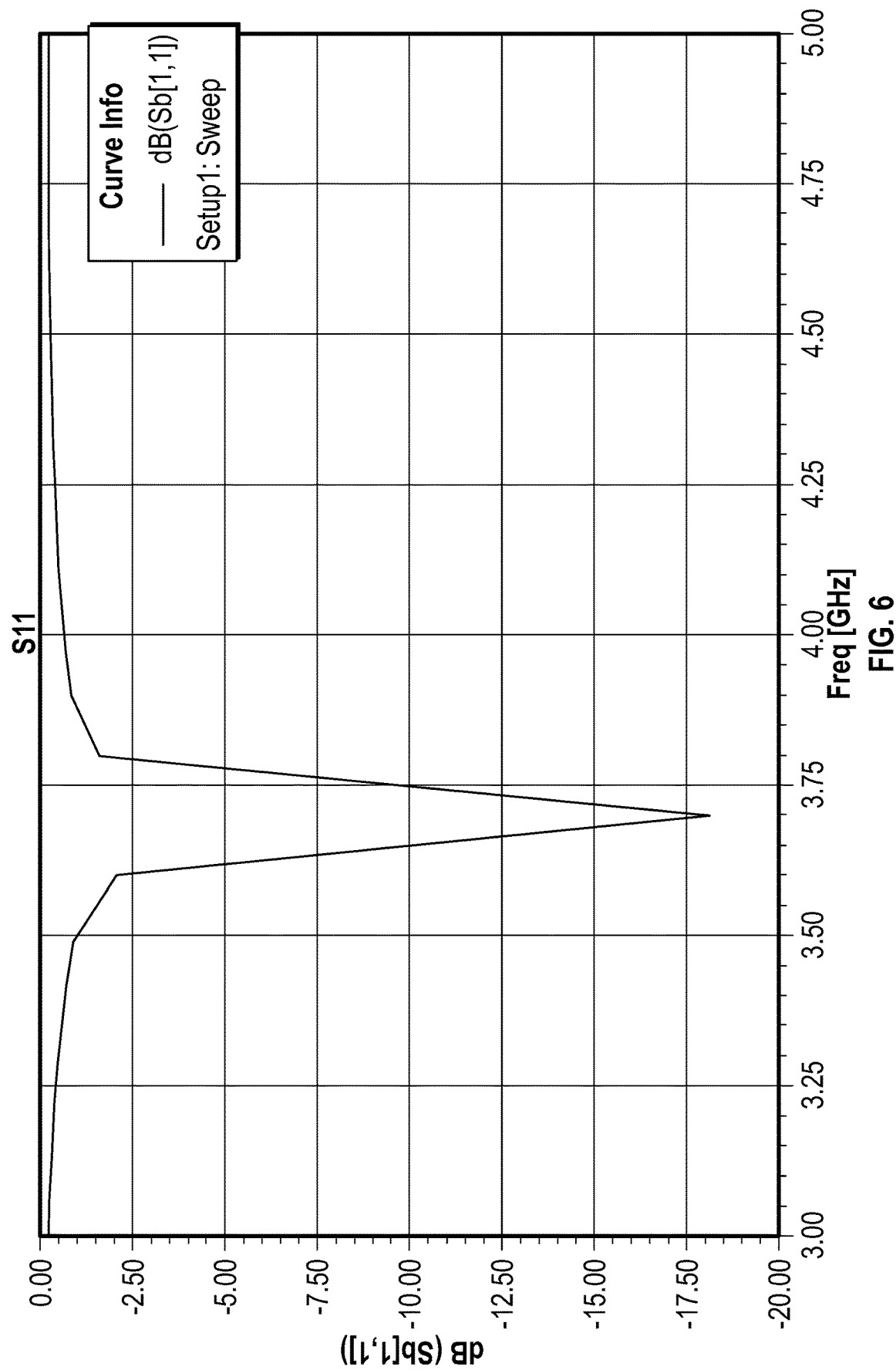
FIG. 6 is a backscattering parameters graph for an embodiment of a patch antenna.

At the resonant frequency, the antenna would accept the energy and re-radiate the energy back into space. This effect could be accurately depicted by a backscattering parameters graph, as depicted at FIG. 6. Backscattering parameters refer to the ports of transmission and receiving.

The S11 graph, receiving from port 1 and transmission through port 1, was often referred to as reflection. From the S11 plot, it was seen that the resonant frequency of the sensor could be accurately explained at the frequency where the signal was accepted by the antenna, thus not returning to port 1.

A k-type thermocouple was placed inside the furnace and read by a PXIE-thermocouple DAQ in order to verify the temperature displayed by the furnace thermocouple. A small temperature gradient of less than 5° C. was observed in the furnace.

The furnace door was left open in order to allow an electromagnetic signal to propagate inside the furnace. The foam was Moldatherm Insulation, which is an RF transparent material and good thermal insulator.

Therefore, the temperature at the furnace was able to heat uniformly without the metallic door in place. The horn antenna was positioned 0.5 meters away, and set to broadcast an electromagnetic wave into the furnace.

Example 4—Digital Signal Processing (DSP)

This example describes the DSP algorithm that was used in order to extract the sensors' resonance, which was later converted to temperature. Time domain gating was applied in order to isolate the temperature sensor in a high reflection environment.

Figure 7:
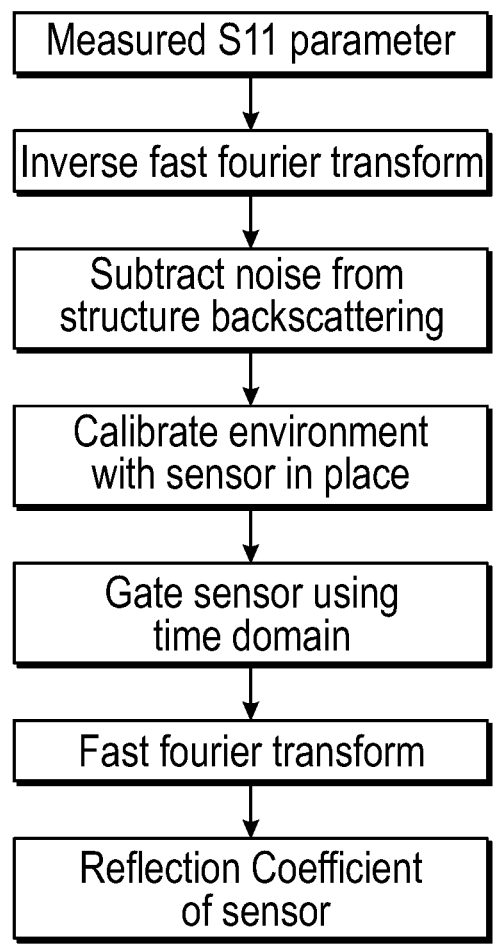
FIG. 7 depicts a flow chart of an embodiment of a digital signal processing algorithm.

The flow chart of the DSP algorithm of this example is depicted at FIG. 7. First, the S11 graph was recorded by interrogating the furnace with a horn antenna without a sensor. Then, an Inverse Fast Fourier Transform (IFFT) was used to transform from the frequency to time domain. In the time domain, the S11 response was calibrated to characterize the structure mode backscattering that occurred due to reflections inside of the furnace. These internal reflections were filtered out by subtracting the reflections from the S11 graph. Second, the sensor was placed inside of the furnace and another calibration was performed in order to isolate the sensor. With the sensor in place at the desired distance, the time domain gate was applied in order to isolate the sensors' response inside the furnace.

The time domain gate was found to be between 3.5 and 6.5 nanoseconds and was found by setting up the sensor, foam insulation block, and horn in a near reflection-less environment. After the gate was applied, a Fast Fourier Transform (FFT) was used to convert back to the frequency domain from the time domain.

The final processes signal was then scaled and the lowest amplitude was taken as the resonant frequency of the sensor. This resonant point was then processed by an algorithm that referenced the resonance of the sensor to permittivity, and then temperature.

In the time domain, 0 seconds referred to the feeding point of the horn antenna, and each impulse could be seen versus time. The first wave packet corresponded to the reflections between the furnace and the horn. The second wave of information was the sensor resonating inside the furnace.

Figure 8:
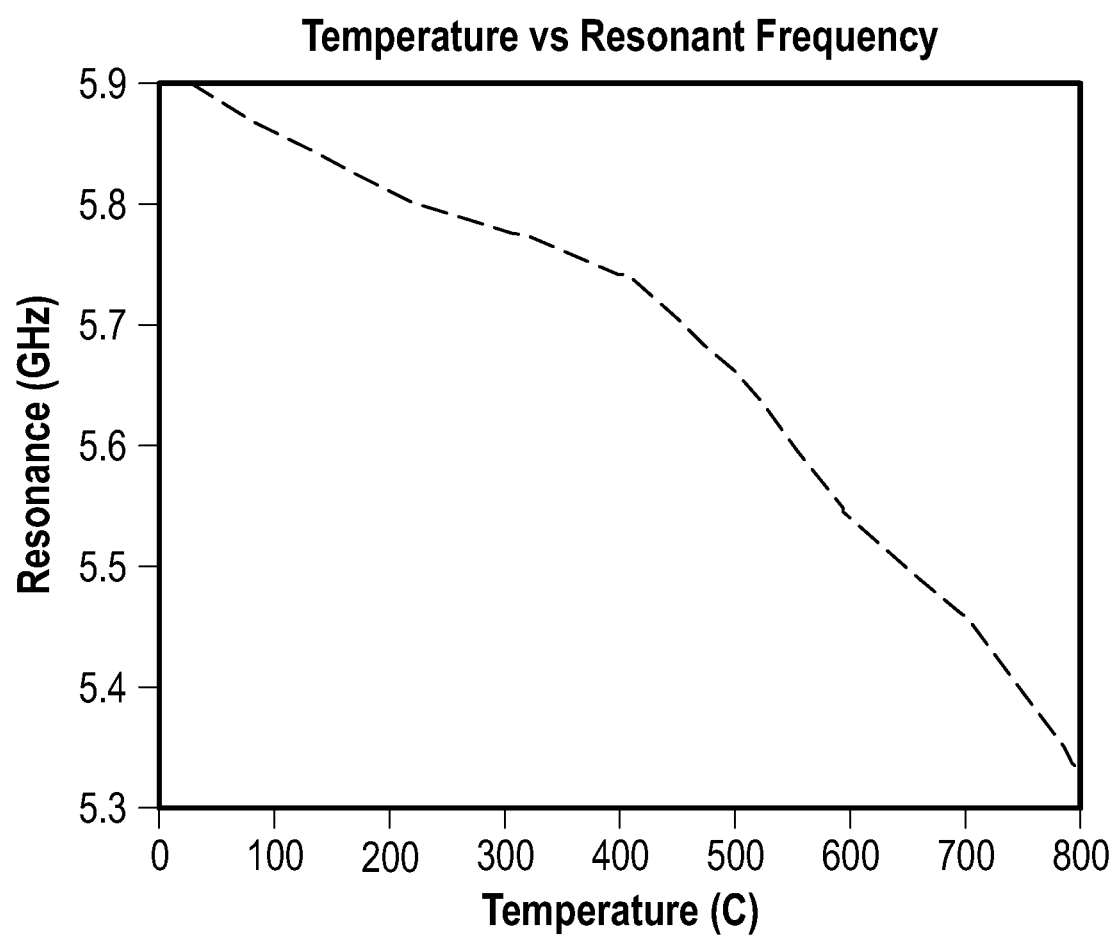
FIG. 8 depicts a plot of resonant frequency versus temperature for an embodiment of a device provided herein.

A time domain gate was applied between 3.5-6.5 nanoseconds, which corresponded with the round trip distance of 0.5 meters. As the temperature at the furnace was increased, temperature measurements were made every 50° C. The plot of the resonant frequency versus temperature is depicted at FIG. 8.

Figure 9:
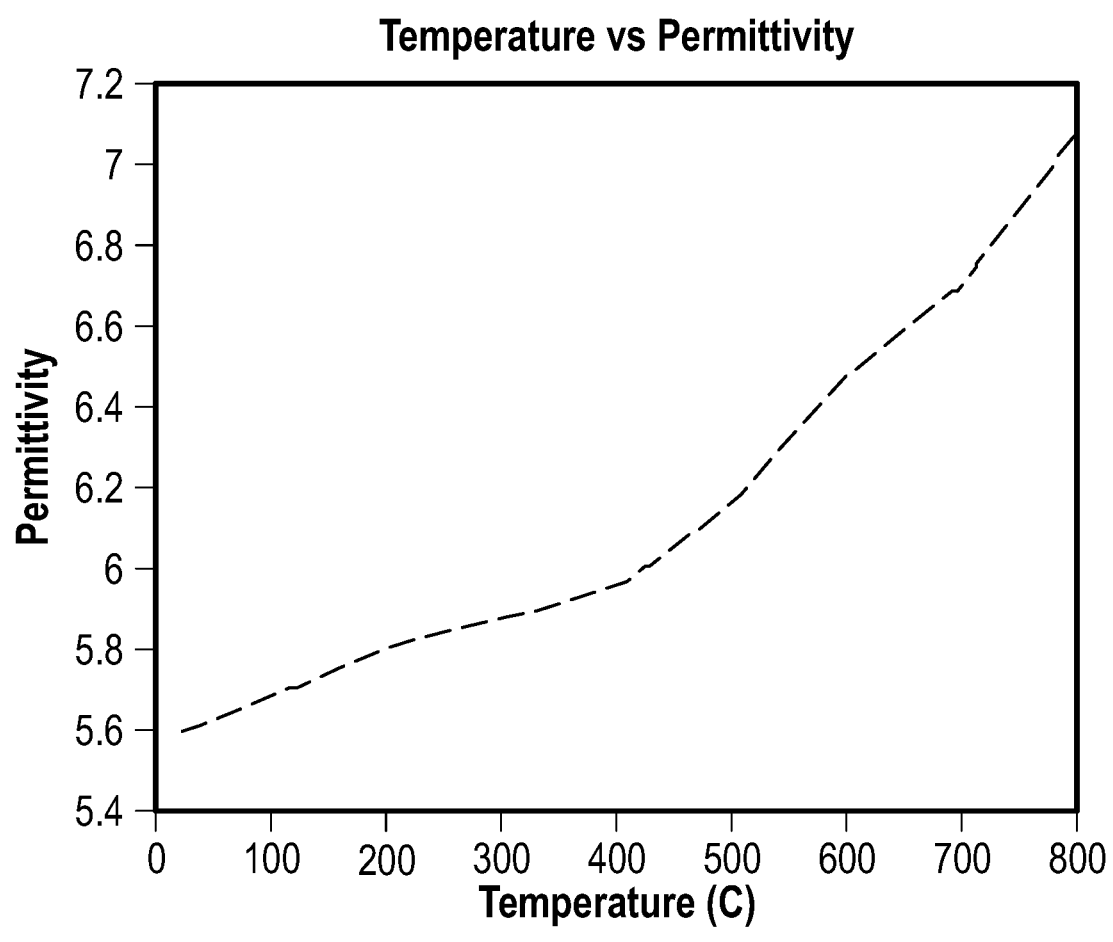
FIG. 9 depicts a plot of temperature versus permittivity for an embodiment of a device provided herein.

It could be seen that there was a monotonically decreasing relationship between the resonant frequency and the temperature at the furnace. This was due to an increasing permittivity of the PDC substrate, which could be calculated as depicted at FIG. 9.

At about 400° C., an increase in the slope between permittivity and temperature was observed. This was due to an exponentially increasing permittivity change of the PDC substrate. Thus, as the temperature was increased to 1,000° C., the temperature sensor actually had an increase in its resolution.

The simulation depicted at FIG. 4 differed from the experimental results, apparently due to a difference in permittivity of the substrate. The simulation was performed using data from the literature (e.g., Ren, X., et al. IEEE Transactions on Microwave Theory and Techniques, 61(2): 960-971, 2013), due to the difficulty of measuring permittivity at elevated temperatures.

We claim:

1. A device for temperature sensing in high temperature environments comprising:
   a patch comprising a conductive material;
   a substrate (i) comprising a polymer derived ceramic, and (ii) having a dielectric constant ($\varepsilon_r$) at 25° C. of about 2 to about 6; and
   a ground plane;
   wherein the substrate is arranged between the patch and the ground plane, and the substrate is in contact with both the patch and the ground plane.

2. The device of claim 1, wherein the polymer derived ceramic comprises SiC, SiCN, SiBCN, SiAlCN, SiOC, or a combination thereof.

3. The device of claim 1, wherein at least one of the patch and the ground plane comprises a dried carbon paste, a dried silver paste, a dried platinum paste, or a combination thereof.

4. The device of claim 1, wherein the patch has a thickness of about 1.8 mm to about 2.4 mm, a length of about 12 mm to about 16 mm, and a width of about 9 mm to about 11 mm.

5. The device of claim 1, wherein the patch has a thickness of about 1.5 mm to about 3 mm.

6. The device of claim 1, wherein the patch has a thickness of about 1.8 mm to about 2.4 mm.

7. The device of claim 1, wherein the patch has a length of about 10 mm to about 20 mm.

8. The device of claim 1, wherein the patch has a length of about 12 mm to about 16 mm.

9. The device of claim 1, wherein the patch has a width of about 8 mm to about 12 mm.

10. The device of claim 1, wherein the patch has a width of about 9 mm to about 11 mm.

11. A system for measuring temperature, the system comprising:
    a receiving antenna comprising the device of claim 1;
    an interrogation antenna; and
    a vector network analyzer.

12. The system of claim 11, wherein a distance between the receiving antenna and the interrogation antenna is at least 0.5 m.

13. The system of claim 11, wherein the receiving antenna of the system is arranged in or on (i) a turbine engine, (ii) a hypersonic vehicle, (iii) a nuclear reactor, or (iv) a fuel cell.

14. A method of measuring a temperature at a location, the method comprising:
- providing the system of claim 11, wherein the receiving antenna is disposed at the location;
- generating a frequency sweep with the vector network analyzer;
- broadcasting the frequency sweep to the receiving antenna with the interrogation antenna;
- determining the resonant frequency of the receiving antenna; and
- converting the resonant frequency to the temperature at the location.

15. The method of claim 14, wherein the temperature at the location is about 700° C. to about 1,800° C.

16. The method of claim 14, wherein a pressure at the location is about 1 atm.

17. The method of claim 14, wherein a pressure at the location is about 200 psi to about 50,000 psi.

18. The method of claim 14, wherein the frequency sweep comprises a plurality of frequencies from about 1 GHz to about 50 GHz.

19. The device of claim 1, wherein the dielectric constant ($\varepsilon_r$) at 25° C. is about 4 to about 6.

20. The device of claim 1, wherein the dielectric constant ($\varepsilon_r$) at 25° C. is about 5.

* * * * *